United States Patent
Jang et al.

(10) Patent No.: US 9,348,148 B2
(45) Date of Patent: May 24, 2016

(54) PATTERNED RETARDER TYPE DISPLAY DEVICE HAVING BLACK STRIPS

(71) Applicant: LG DISPLAY CO., LTD., Seoul (KR)

(72) Inventors: Juhoon Jang, Seoul (KR); Jinyeong Kim, Gyeonggi-do (KR); Heeyoung Chae, Gyeonggi-do (KR); Seungman Ryu, Gyeonggi-do (KR); Meeran Park, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 600 days.

(21) Appl. No.: 13/669,698

(22) Filed: Nov. 6, 2012

(65) Prior Publication Data

US 2013/0314781 A1    Nov. 28, 2013

(30) Foreign Application Priority Data

May 22, 2012  (KR) .................. 10-2012-0054334

(51) Int. Cl.
| | |
|---|---|
| *G02B 27/26* | (2006.01) |
| *G02B 5/20* | (2006.01) |
| *G02B 5/30* | (2006.01) |
| *G02B 27/22* | (2006.01) |

(52) U.S. Cl.
CPC .............. *G02B 27/26* (2013.01); *G02B 5/201* (2013.01); *G02B 5/3083* (2013.01); *G02B 27/2214* (2013.01)

(58) Field of Classification Search
CPC ........... G02B 27/2214; G02B 27/2264; G02B 27/017; G02B 27/26; G02B 27/22; G02B 27/2228; G02B 27/2257; G02B 27/2235; G02B 27/225; H04N 13/0404–13/0406; H04N 13/0409; H04N 13/0497; H04N 13/0239; H04N 13/0055; H04N 13/0296; H04N 13/0431; H04N 13/0242; H04N 13/0048; H04N 13/021; H04N 13/0221; H04N 13/0037; H04N 13/0051; H04N 13/044; H04N 13/0438; H04N 13/0003; H04N 13/0422; H04N 13/0434; H04N 13/0459; H04N 13/04; H04N 9/3197; H04N 9/3105; G03B 35/00–35/12; G03B 35/20; G03B 31/06; G03B 31/00; G02F 1/13; G02F 1/1335; G02F 1/13363; G02F 2207/123; G02F 1/133512; G02F 2001/133631

See application file for complete search history.

(56) References Cited

U.S. PATENT DOCUMENTS

| | | | | |
|---|---|---|---|---|
| 8,913,203 | B2 * | 12/2014 | Chen .................. | G02B 27/0018 349/117 |
| 2007/0085814 | A1 * | 4/2007 | Ijzerman et al. .............. | 345/102 |
| 2007/0258140 | A1 * | 11/2007 | Shestak et al. ..... | H04N 13/0404 359/465 |
| 2010/0033557 | A1 | 2/2010 | Abe et al. | |
| 2012/0140129 | A1 * | 6/2012 | Chang ................ | G02B 27/2242 349/15 |

FOREIGN PATENT DOCUMENTS

JP    2010-055043 A    3/2010

* cited by examiner

*Primary Examiner* — Stephone B Allen
*Assistant Examiner* — Jyotsna Dabbi
(74) *Attorney, Agent, or Firm* — Morgan, Lewis & Bockius LLP

(57) ABSTRACT

A patterned retarder type display device includes a display panel having a plurality of unit pixel lines disposed in column direction, each unit pixel line including N (N is a natural number) pixel lines, a patterned retarder film disposed on the outer surface of the display panel and including unit patterned retarders corresponding to each of the unit pixel lines, and a black strip disposed between two unit patterned retarders on the outer surface of the display panel. The display device may provide an excellent 3D viewing angle, and the brightness dropdown caused by the black strip can be reduced.

6 Claims, 5 Drawing Sheets

PATTERNED RETARDER TYPE DISPLAY DEVICE HAVING BLACK STRIPS

This application claims the benefit of Korea Patent Application No. 10-2012-0054334 filed on May 22, 2012, which is incorporated herein by reference for all purposes as if fully set forth herein.

BACKGROUND OF THE INVENTION

1. Field of the Invention

The present disclosure relates to a patterned retarder type display device having a black strip and a method for manufacturing the same. Especially, the present disclosure relates to a patterned retarder type display device in which one black strip is disposed at every two or more unit patterned retarders in order to prevent the aperture ratio and the brightness from being degraded caused by the overlapping structure between the black matrix and the black strip.

2. Discussion of the Related Art

Recently, thanks to the advancement of the various video contents, the display devices which can selectively reproduce 2D images and 3D images are actively developed. For reproducing the 3D images, the display uses the stereoscopic technique or the autostereoscopic technique.

As one example of the glasses type, there is a 3D display device having a patterned retarder on the display panel. This 3D display device represents the 3D images using the polarization characteristics of the patterned retarder and the polarization glasses. Therefore, there is no cross-talk problem between the left eye image and the right eye image, and it ensures brighter luminescence so that the quality of the image is better than other types of 3D display devices.

FIG. 1 is the perspective view illustrating the structure of a 3D display system having a patterned retarder according to the related art. The patterned retarder type 3D display system represents the 3D images using the polarization characteristics of the patterned retarder PR disposed on the display panel DP and those of the polarization glasses PG used by the observer.

Referring to FIG. 1, the patterned retarder type 3D display system includes a display panel DP representing 2D image or 3D image, a patterned retarder PR attached on the front surface of the display panel DP, and polarization glasses PG.

The display panel DP, as the device for displaying 2D video images and/or 3D video images, can include any one of the liquid crystal display device (or LCD), the field emission display (or FED), the plasma display panel (or PDP), the electroluminescence device (or EL) including the inorganic light emitting diode and the organic emitting diode (or OLED), and electrophoresis display device (or EPD). Hereinafter, we will explain the embodiments of the present disclosure focused on the case in which the display panel DP is the liquid crystal display panel.

The display panel DP includes liquid crystal cells disposed in matrix manner defined by the crossing structure of the data line and the gate line. The lower glass substrate SL of the display panel DP comprises the pixel arrays including the data lines, the gate lines, the thin film transistors, the pixel electrodes, and the storage capacitors. The upper glass substrate SU of the display panel DP comprises the black matrix, the color filter, and the common electrode. Each liquid crystal cell is driven by the electric field formed between the pixel electrode connected to the thin film transistor and the common electrode. Each inside surface of the upper glass substrate SU and the lower glass substrate SL has an alignment layer, respectively for setting up the pre tilt angle of the liquid crystal. Each outside surface of the upper glass substrate SU and the lower glass substrate SL has the upper polarization film PU and the lower polarization film PL, respectively.

The patterned retarder PR is attached on the outside surface of the upper polarization film PU of the display panel DP. The patterned retarder PR has a unit retarder corresponding to each line of pixel arrayed in the horizontal direction of the display panel DP. For example, one unit retarder can be defined as corresponding to the area of the pixels commonly connected to one gate line. Especially, the first retarder RT1 is formed as to be corresponding to the odd numbered lines of the patterned retarder PR, and the second retarder RT2 is formed as to be corresponding to the even numbered lines of the patterned retarder PR. The first retarder RT1 can transmit the first circular polarized light by retarding the phase of the light with +λ/4 (here, 'λ' is the wavelength of the light incident from the pixel array). The second retarder RT2 can transmit the second circular polarized light by retarding the phase of the light with −λ/4 (actually, +3λ/4). The light absorbing axis (or light transmitting axis) of the first retarder RT1 and the light absorbing axis of the second retarder RT2 are perpendicular each other.

For example, the first retarder RT1 of the patterned retarder PR can be the polarizing filter transmitting the left circular polarized light, and the second retarder RT2 of the patterned retarder PR can be the polarizing filter transmitting the right circular polarized light. In this case, the light of the video images represented on the odd numbered lines of the display panel DP can transmit the first retarder RT1 and then it becomes to the first circular polarized light (i.e., the left circular polarized light). Furthermore, the light of the video image represented on the even numbered lines of the display panel DP can transmit the second retarder RT2 and then it becomes to the second circular polarized light (i.e., the right circular polarized light).

The polarization glasses PG comprises a left glass window LG having the first polarizing filter P1 and a right glass window RG having the second polarizing filter P2. The first polarizing filter P1 has the same light polarization characteristic with that of the first retarder RT1 of the patterned retarder PR. At the same time, the second polarizing filter P2 has the same light transmitting axis with that of the second retarder RT2 of the patterned retarder PR. For example, the first polarizing filter P1 of the polarization glasses PG can be the left circular polarizing filter, and the second polarizing filter P2 of the polarization glasses PG can be the right circular polarizing filter.

With this structure, by representing the left images on the pixels relating to the first retarder RT1, and representing the right images on the pixels relating to the second retarder RT2, the 3D images can be implemented. In the 3D display system as shown in FIG. 1, by setting the polarized light characteristic of the left eye images different from that of the right eye images, the left eye image and the right eye images can be separately reached to the observer's left eye and right eye, respectively.

In the 3D display device having the film patterned retarder, as the left eye image and the right eye image are alternatively represented in the unit of pixel row, there are some cross-talk problems at the wide view angle along to the up-down directions. FIG. 2 is a cross sectional view along the cutting line A-A' in FIG. 1 illustrating that the cross-talk problem occurring at the 3D display device as shown in FIG. 1.

Referring to FIG. 2, when observing the video data at upper side (or lower side) than the straight front direction, the left eye image L1 and the right eye image R1 can transmit through the first patterned retarder RT1, at the same time. As a result, the cross-talk problem is occurred in which the left eye image L1 and the right eye image R1 pass through the left glass window LG of the polarization glasses PG, at the same time. Even though, there is a black matrix BM at the border between the pixels in horizontal units, the black matrix BM does not have enough width to prevent the cross-talk problem.

In order to solve this cross-talk problem in the vertical view angle direction, some methods have been suggested. The first method is to make the width of the black matrix BM wider so that the wide view angle in which the cross-talk problem is not occurred can be ensured. FIG. 3 is the cross-sectional view illustrating the 3D display device in which the black matrix having wider width than the width of black matrix shown in FIG. 2.

Referring to FIG. 3, on the light path at which the right eye images R1 passes through the first retarder RT1, a black matrix BM having wider width is disposed so that the right eye image R1 passing through the first retarder RT1 can be blocked. Therefore, when an observer located at the straight front of the display device moves up side or down side somewhat, the cross-talk problems are not occurred. However, in this structure, in order to prevent the cross-talk problem more effectively, the black matrix BM should have remarkably wider width. As the width of the black matrix BM is getting wider, the aperture ratio at the front direction is getting lowered and then the brightness may be degraded or the correct color cannot be represented.

Like this, there is a trade-off relationship between the front aperture ratio and the cross-talk improvement. Furthermore, it is hard to find proper conditions therebetween. Therefore, required is a new method for ensuring the front aperture ratio and for enhancing the cross-talk problem at the same time.

SUMMARY OF THE INVENTION

In order to overcome the above mentioned drawbacks, the purpose of the present disclosure is to suggest a display device in which the black matrix and the black strip are overlapped each other having a upper substrate therebetween, furthermore, the width of the black strip is not larger than that of the black matrix and the cross-talk problem between the left-eye image and the right-eye image is effectively prevented. Another purpose of the present disclosure is to suggest a patterned retarder type display device in which, lowering the number of the black strips, the brightness at the front direction cannot be degraded by the black strip. Still another purpose of the of the present disclosure is to suggest a patterned retarder type display device having the black strips for ensuring a wide viewing angle by reducing the cross-talk problem between the left-eye 3D image and the right-eye 3D image, and for minimizing the degrade of the brightness at the front direction.

In order to accomplish the above purpose, the present disclosure suggests a patterned retarder type display device comprising: a display panel having a plurality of unit pixel lines disposed in column direction, wherein each unit pixel line includes N (N is one of natural number) pixel lines; a patterned retarder film disposed on the outer surface of the display panel and including unit patterned retarders corresponding to each of the unit pixel lines; and a black strip disposed between two unit patterned retarders on the outer surface of the display panel.

The unit pixel line is one of a left-eye pixel line for representing a left-eye image of one unit line image and a right-eye pixel line for representing a right-eye image of the one unit line image; the unit patterned retarder includes a first patterned retarder corresponding to the left-eye pixel line and a second patterned retarder corresponding to the right-eye pixel line; and wherein the black strip is disposed between the first patterned retarder and the second patterned retarder.

The N is 1 and the unit pixel line includes one pixel line; and the black strip is disposed at every two pixel lines.

The black strip is disposed between the left-eye pixel line representing one unit line image and the right-eye pixel line representing the one unit line image, excepting between the left-eye pixel line representing one unit line image and the right-eye pixel line representing another unit line image.

The N is natural number larger than 1 and each of the unit pixel lines includes N pixel lines; and the black strip is disposed between two neighboring unit pixel lines.

According to the present disclosure, the display device, when representing 3D images, can reduce the cross-talk problem and minimize the brightness dropdown (or reduction) at front side. The display device according to the present disclosure provides excellent 3D viewing angle because it can prevent the 3D cross-talk problem by disposing the black matrix and the black strip with thick substrate therebetween. At the same time, the black strip can be disposed in a manner that one black strip is allocated at least two pixel lines, so that the brightness dropdown caused by the black strip can be reduced, enhanced and/or overcome.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Figure 1:
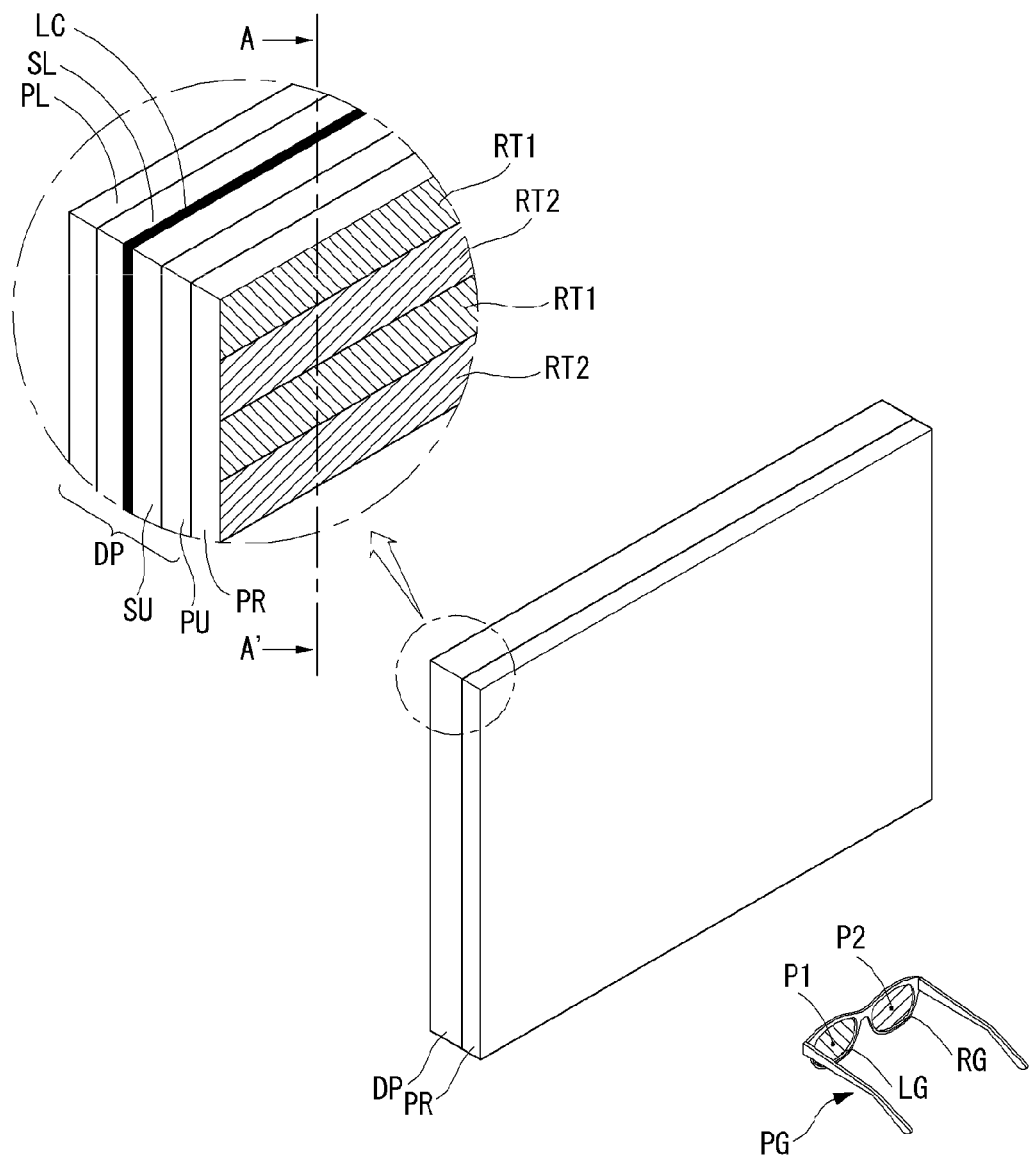
FIG. 1 is the perspective view illustrating the structure of a 3D display system having a patterned retarder according to the related art.
Figure 2:
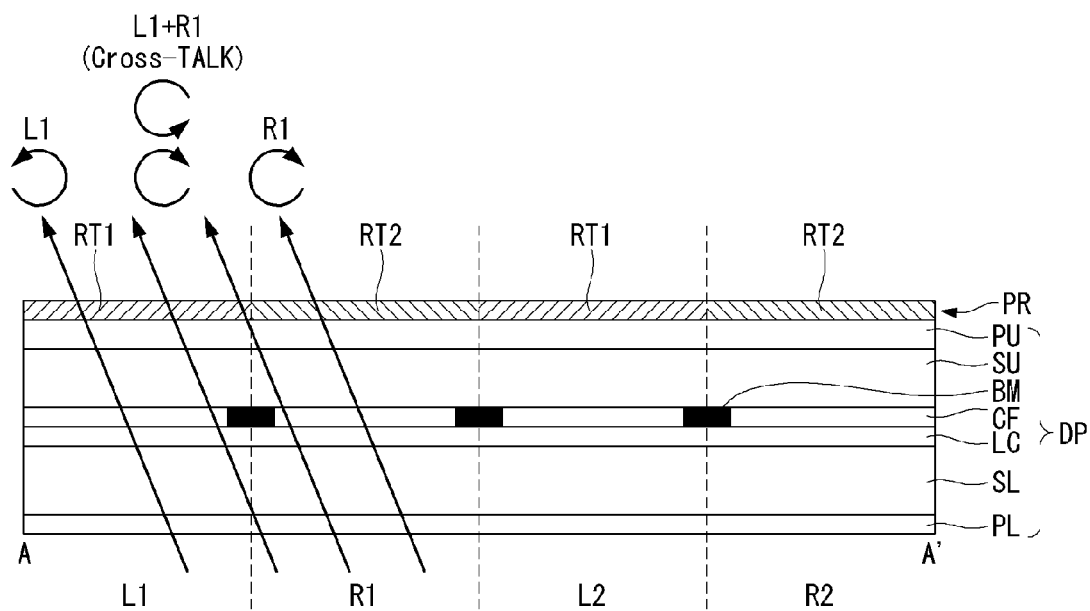
FIG. 2 is a cross sectional view along the cutting line A-A' in FIG. 1 illustrating that the cross-talk problem occurring at the 3D display device as shown in FIG. 1.

Referring to attached figures, we will explain preferred embodiments of the present disclosure. Like reference numerals designate like elements throughout the detailed description. However, the present disclosure is not restricted by these embodiments but can be applied to various changes or modifications without changing the technical spirit. In the following embodiments, the names of the elements are selected by considering the easiness for explanation so that they may be different from actual names.

Figure 4:
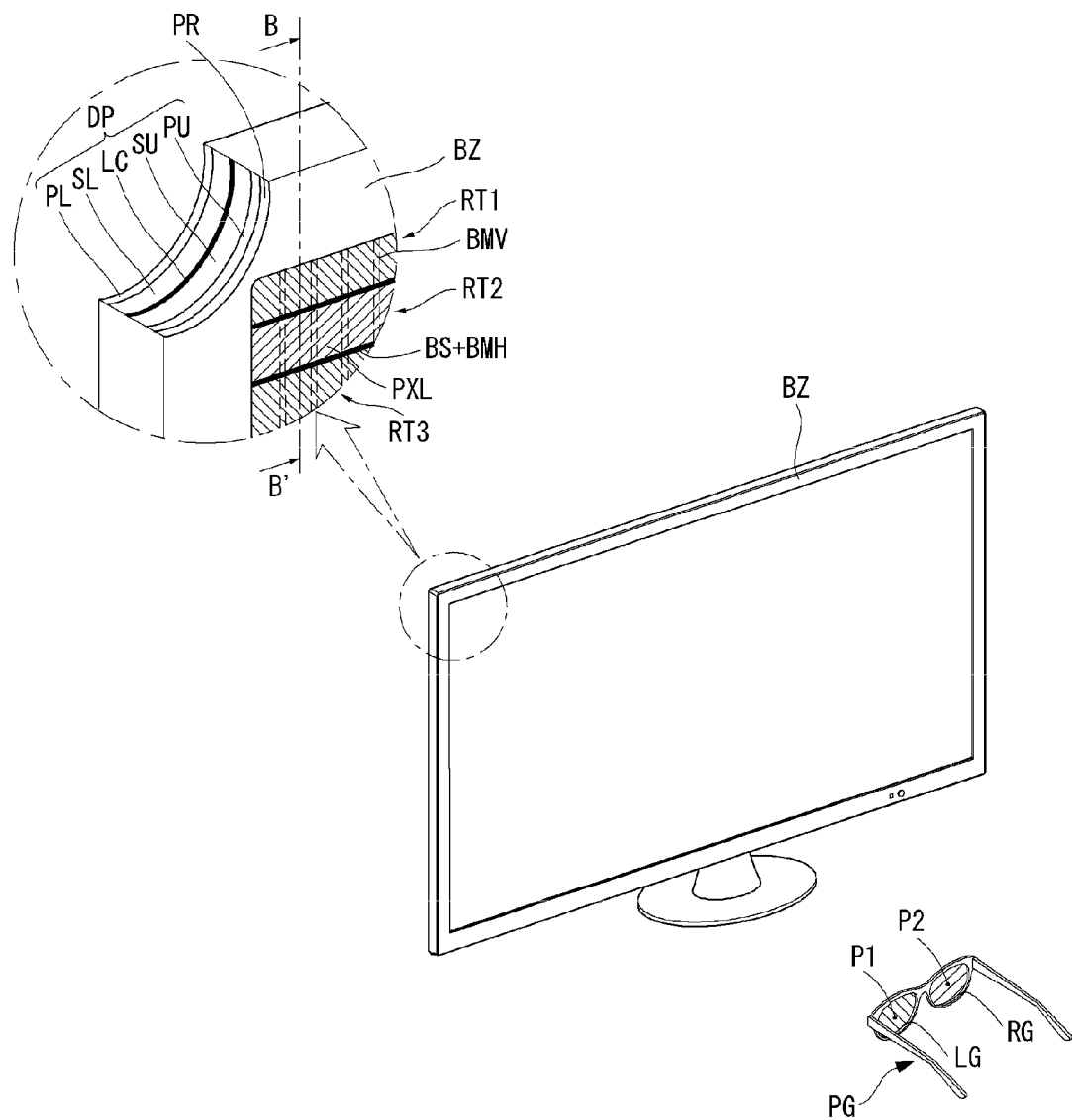
FIG. 4 is the perspective view illustrating the structure of a patterned retarder type 3D display panel having a double-black strip, according to the first embodiment of the present disclosure.
Figure 5:
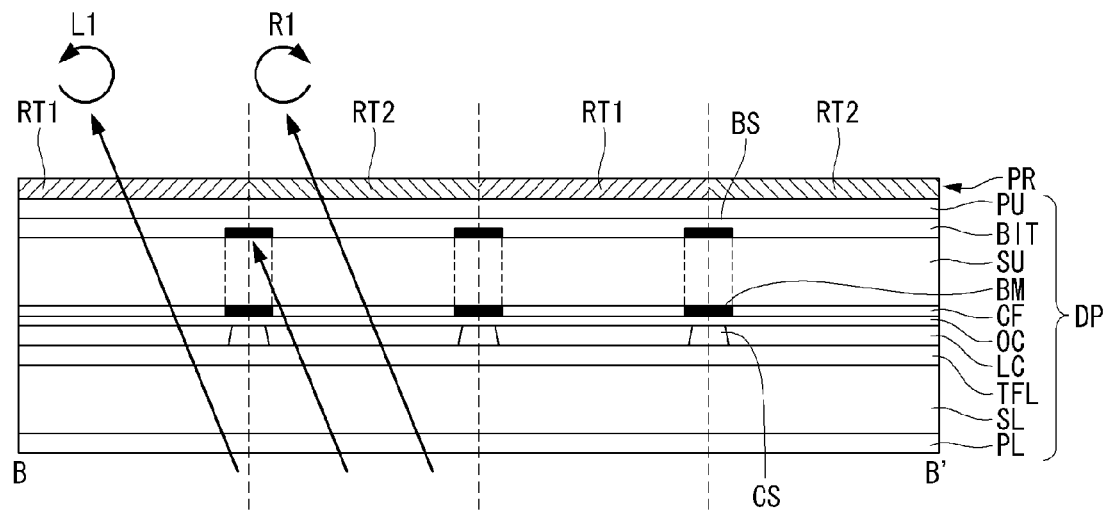
FIG. 5 is the cross-sectional view illustrating the structure of a patterned retarder type 3D display panel along the cutting line B-B' in FIG. 4, according to the first embodiment.

Referring to FIG. 4 and FIG. 5, we will explain the first embodiment according to the present disclosure. FIG. 4 is the perspective view illustrating the structure of a patterned retarder type 3D display panel having a double-black strip, according to the first embodiment of the present disclosure. FIG. 5 is the cross-sectional view illustrating the structure of a patterned retarder type 3D display panel along the cutting line B-B' in FIG. 4, according to the first embodiment.

At first, referring to FIG. 4, the 3D display system according to the first embodiment of the present disclosure represents the 3D images using the polarization characteristics of the patterned retarder PR disposed on the display panel DP and those of the polarization glasses PG used by the observer.

As shown in FIG. 4, the patterned retarder type 3D display system includes a display panel DP representing 2D image or 3D image, a patterned retarder PR attached on the front surface of the display panel DP, and polarization glasses PG. The display panel DP, as the device for displaying 2D video images and/or 3D video images, can include any one of the liquid crystal display device (or LCD), the field emission display (or FED), the plasma display panel (or PDP), the electroluminescence device (or EL) including the inorganic light emitting diode and the organic emitting diode (or OLED), and electrophoresis display device (or EPD). Hereinafter, we will explain the embodiments of the present disclosure focused on the case in which the display panel DP is the liquid crystal display panel.

The display panel DP includes liquid crystal cells disposed in matrix manner defined by the crossing structure of the data line and the gate line. The lower glass substrate SL of the display panel DP comprises the pixel arrays including the data lines, the gate lines, the thin film transistors, the pixel electrodes, and the storage capacitors. The upper glass substrate SU of the display panel DP comprises the black matrix, the color filter, and/or the common electrode. Each liquid crystal cell is driven by the electric field formed between the pixel electrode connected to the thin film transistor and the common electrode. Each outside surface of the upper glass substrate SU and the lower glass substrate SL has the upper polarization film PU and the lower polarization film PL, respectively. They may be disposed in a manner that the light transmitting axes of them are perpendicularly crossed.

The patterned retarder PR is attached on the outside surface of the upper polarization film PU of the display panel DP. The patterned retarder PR has a unit retarder corresponding to each line of pixel arrayed in the horizontal direction of the display panel DP. For example, one unit retarder can be defined as corresponding to the area of the pixels commonly connected to one gate line. Especially, the first retarder RT1 is formed as to be corresponding to the odd numbered lines of the patterned retarder PR, and the second retarder RT2 is formed as to be corresponding to the even numbered lines of the patterned retarder PR. The first retarder RT1 can transmit the first circular polarized light by retarding the phase of the light with $+\lambda/4$ (here, '$\lambda$' is the wavelength of the light incident from the pixel array). The second retarder RT2 can transmit the second circular polarized light by retarding the phase of the light with $-\lambda/4$ (actually, $+3\lambda/4$). The light absorbing axis (or light transmitting axis) of the first retarder RT1 and the light absorbing axis of the second retarder RT2 are perpendicular each other.

For example, the first retarder RT1 of the patterned retarder PR can be the polarizing filter transmitting the left circular polarized light, and the second retarder RT2 of the patterned retarder PR can be the polarizing filter transmitting the right circular polarized light. In this case, the light of the video images represented on the odd numbered lines of the display panel DP can transmit the first retarder RT1 and then it becomes to the first circular polarized light (i.e., the left circular polarized light). Furthermore, the light of the video image represented on the even numbered lines of the display panel DP can transmit the second retarder RT2 and then it becomes to the second circular polarized light (i.e., the right circular polarized light).

The polarization glasses PG comprises a left glass window LG having the first polarizing filter P1 and a right glass window RG having the second polarizing filter P2. The first polarizing filter P1 has the same light polarization characteristic with that of the first retarder RT1 of the patterned retarder PR. At the same time, the second polarizing filter P2 has the same light transmitting axis with that of the second retarder RT2 of the patterned retarder PR. For example, the first polarizing filter P1 of the polarization glasses PG can be the left circular polarizing filter, and the second polarizing filter P2 of the polarization glasses PG can be the right circular polarizing filter.

With this structure, by representing the left images on the pixels relating to the first retarder RT1, and representing the right images on the pixels relating to the second retarder RT2, the 3D images can be implemented. In the 3D display system as shown in FIG. 4, by setting the polarized light characteristic of the left eye images different from that of the right eye images, the left eye image and the right eye images can be separately reached to the observer's left eye and right eye, respectively.

Especially, when 3D video data is represented on the display panel DP, one left eye image or one right eye image are alternately displayed at every pixel row. The black strip BS for preventing the cross-talk problem between the left eye images and the right eye images is disposed on the outer surface of the upper substrate SU (between the upper substrate SU and the upper polarization film PU). Furthermore, the black strip BS having the same or narrower width than that of the horizontal black matrix BMH, is disposed within the area which is corresponded to the horizontal black matrix BMH formed on the inner surface of the upper substrate SU.

In FIG. 4, the vertical black matrix BMV is formed on the inner surface of the upper substrate SU so it is shown as the dotted line. On the contrary, the black strip BS overlapping with the horizontal black matrix BMH is formed on the outer surface of the upper substrate SU, so it is shown as the black solid strip.

Furthermore, in FIG. 4, the drawing symbol 'BZ' means the bezel area. The bezel area BZ includes the non-display area where the sealant is disposed to join the upper substrate SU and the lower substrate SL of the display panel DP, where the driving circuit is disposed and/or where some electrical elements connecting the driving circuit and display elements are formed.

Hereinafter, referring to FIG. 5, we will explain the cross-sectional structure of the patterned retarder type 3D display device panel according to the first embodiment of the present disclosure, in detail. On the upper surface of the transparent lower substrate SL for a thin film transistor substrate, a plurality of the pixel areas disposed in a matrix manner is defined by forming a plurality of gate lines and a plurality of data lines crossing each other. At each pixel area, a thin film transistor and a pixel electrode connected to and driven by the thin film transistor are formed. In FIG. 5 the layer including the driving elements such as the thin film transistor and the pixel electrode is represented as the thin film transistor layer TFL, in convenience.

On the outer surface of the transparent upper substrate SU for the color filter, a plurality of the black strips BS is formed. Especially, as the display panel DP according to the present disclosure has the patterned retarder PR running in horizontal direction, it is preferable that the black strip BS is disposed between two neighboring unit patterned retarders RT1 and RT2. In order to prevent the cross-talk between the right-eye image and the left-eye image effectively, and not to reduce the aperture ratio of the display panel DP at the front direction, it is preferable that the width of the black strip BS is equal or less than the width of the black matrix BM. More preferably, the black strip BS has substantially the same width of the black matrix BM and is disposed as overlapping with the black matrix BM vertically.

For example, on the case of small area display panel such as the portable personal digital device and/or notebook computer, it is preferable that the black strip BS is completely overlapped with the horizontal black matrix BMH in the vertical space. On the contrary, on the case of large area display panel such as TV monitor, the black strip BS may be overlapped with the some area of the horizontal black matrix BMH, in order to ensure optimized view condition at the central position of the up-down view angle in front of the display panel. On the whole surface of the upper substrate SU having the black strip BS, a back surface electrode BIT is disposed. The back surface electrode BIT is for removing the static electricity which may be charged during the manufacturing of the display panel DP.

On the inner surface of the upper substrate SU, a plurality of black matrix BM is formed. The black matrix BM, as the border line distinguishing the pixel area, includes the horizontal black matrix BMH running to the horizontal direction of the display panel DP, and the vertical black matrix BMV running to the vertical direction of the display panel DP. For example, the horizontal black matrix BMH is disposed at the area corresponding to the gate line formed on the thin film transistor substrate, and the vertical black matrix BMV is dispose at the area corresponding to the data line formed on the thin film transistor substrate. In this embodiment, the horizontal black matrix BMH is preferably disposed as (completely or partially) overlapping with the black strip BS in the vertical structure.

By the black matrix BM, the color filter area corresponding to the pixel area is defined. In this color filter area, the color filter CF is disposed. I n some cases, the color filter CF may be formed prior to the black matrix BM. On the color filter CF, the over coat layer OC is disposed as covering the whole surface. Even though it is not shown in drawings, on the over coat layer OC, the alignment layer for deciding the initial alignment of the liquid crystal molecules may be further disposed. Otherwise, the over coat layer OC itself may be used as the alignment layer. On the over coat layer OC, the column spacer CS is formed for maintaining the cell gap between the thin film transistor substrate and the color filter substrate. The column spacer CS is preferably formed within the area of the black matrix BM.

The thin film transistor substrate and the color filter substrate are joined each other with the liquid crystal layer LC therebetween. By the column spacer CS, the cell gap between the upper substrate SU and the lower substrate SL can be maintained constantly. On the outer surface of the lower substrate SL for the thin film transistor substrate, the lower polarization film PL is attached. In the same manner, on the outer surface of the upper substrate SU for the color filter substrate, the upper polarization film PU is attached. Furthermore, on the upper polarization film PU, the patterned retarder for representing the 3D images is attached. Especially, the patterned retarder PR is preferably formed in film type.

The black strip BS is overlapped with the black matrix BM, especially the horizontal black matrix BMH. Further, when seeing it from the front direction, it is important to decide the overlapping area in manner that the whole areas including the black strip BS and the horizontal black matrix BMH should not degrade the front aperture ratio of the display panel. For example, in the cases of small area display panel such as the portable personal display device, it is preferable that the black strip BS and the horizontal black matrix BMH would have the same width and be completely overlapped each other. However, in the cases of large area display panel such as TV monitor, the black strip BS may be overlapped with some portions of the horizontal black matrix BMH. In these cases, the black strip BS may has a width the same with or less the width of the horizontal black matrix BMH and be overlapped with some portions of the horizontal black matrix BMH. The overlapping structure should be decided in manner that, when viewing in front direction, the areas of the black strip BS which are not overlapped with the horizontal black matrix BMH should not degrade the aperture ratio of the display panel DP. As a result, when the 3D video images are represented, it is possible to ensure the same front brightness when the 2D video images are represented.

Furthermore, as the black strip BS and the black matrix MB are formed on the outer surface and on the inner surface of the upper substrate SU, respectively, it has the double black strip structure (as the black matrix works like the black strip) in which two black strips are overlapping with the thickness of the upper substrate SU. Therefore, the cross-talk between the left-eye image and the right-eye image can be effectively prevented.

However, according to this structure, one unit patterned retarder is disposed at every line of the pixels, that is, between all pixel lines there is at least one black strip BS. Therefore, seeing the display panel DP at the front side, in the middle portion, it looks like that the black strip BS and the black matrix BM are fully overlapped each other. Therefore, the brightness and the aperture ratio are not reduced. However, seeing the upper and lower side portions at the same position, it looks like that the black strip BS and the black matrix BM are partially overlapped, as the black strip BS and the black matrix BM are overlapped with thickness (of the upper substrate SU) spatially. Due to the double black strip structure, the blocked area of the display panel by the double black strip can be larger as seeing the upper and lower side at the center of the display panel DP. Therefore, when seeing at the front of the display panel, the image of the middle portion has normal brightness, but the images of the upper and lower portion may have the darkened brightness than normal brightness.

Figure 6:
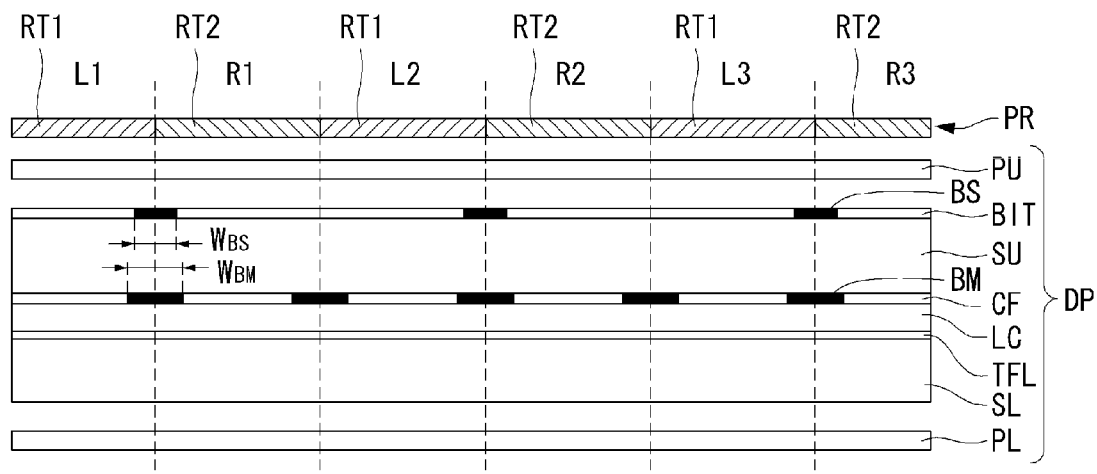
FIG. 6 is the cross-sectional view illustrating the structure of a patterned retarder type 3D display panel having a double-black strip, according to the second embodiment of the present disclosure.

As one example for solving the unevenness of the brightness occurred in the first embodiment, we will explain the second embodiment of the present disclosure referring to FIG. 6. FIG. 6 is the cross-sectional view illustrating the structure of a patterned retarder type 3D display panel having a double-black strip, according to the second embodiment of the present disclosure.

In order to solve the problem of the darkened brightness according to the first embodiment, it is required to form the black strip BS as the black strip width $W_{BS}$ is little narrower than half of the black matrix width $W_{BM}$. For example, for the display panel in which the black matrix width $W_{BM}$ is 158.9 µm (micrometer), it is preferable for the black strip width $W_{BS}$ is about 70 µm.

Furthermore, to prevent from reducing the brightness, one black strip BS of two neighboring black strips BS is removed among all black strips BS disposed at every pixel lines. As a result, the number of black strips BS can be reduced in half so that the front brightness can be effectively increased. In this case, it is expected that the cross-talk between the left-eye image and the right-eye image, especially where the black strip BS is removed, may be increased. However, actually, the cross-talk problem is not severely or seriously occurred.

Figure 3:
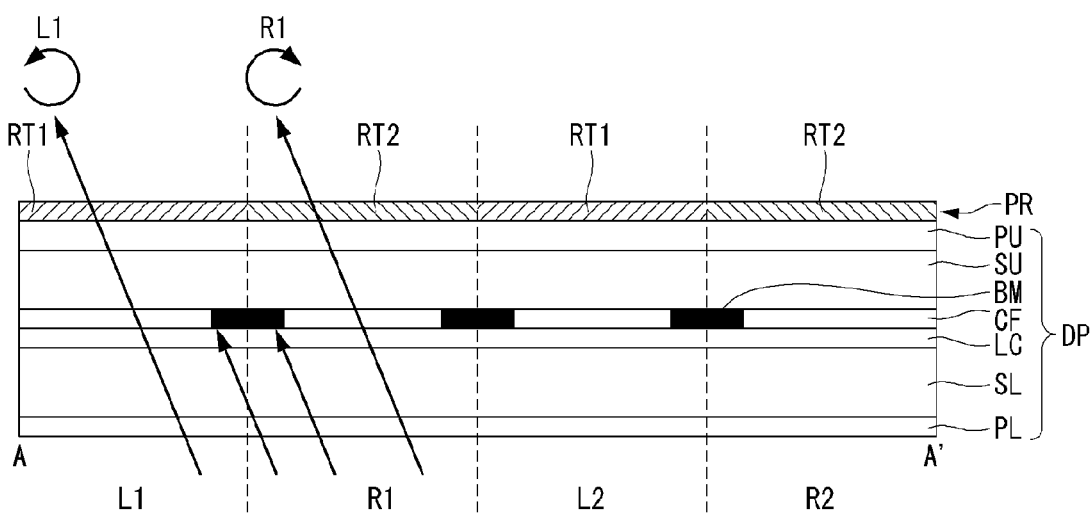
FIG. 3 is the cross-sectional view illustrating the 3D display device in which the black matrix having wider width than the width of black matrix shown in FIG. 2.

As shown in the Table 1, as comparing the patterned retarder type 3D display panel having the double black strip according to the first embodiment and the patterned retarder type 3D display panel having the double black strip according to the second embodiment, there is no change in the viewing angle. However, the brightness dropdown at front side can be remarkably enhanced. In the Table 1, the "normal FPR" means the case in which the width of the black matrix BM is enlarged without forming the black strip BS, as shown in FIG. 3. The "first embodiment" means the case according to the first embodiment of the present disclosure as shown in FIG. 5. And, the "second embodiment" means the case according to the second embodiment of the present disclosure as shown in FIG. 6.

TABLE 1

|  | Normal FPR | First Embodiment | Second Embodiment |
| --- | --- | --- | --- |
| 3D viewing angle | 20° | 26° | 26° |
| Brightness dropdown | 0% (reference value) | 33% | 20% |

According to the first embodiment, comparing with the 'Normal FPR', the 3D viewing angle is enhanced but the brightness at front side is reduced in 33%. On the contrary, according to the second embodiment, the brightness at front side is reduced in 20%. Therefore, the second embodiment can ensure higher aperture ratio and front brightness than the first embodiment. Furthermore, the 3D viewing angle of the second embodiment is not different from the first embodiment. That is, it is clear that the 3D cross-talk problem is not occurred even one black strip is removed from at every two black strips.

In the second embodiment, as one of two black strips BS is removed among the black strips BS of the first embodiment, it is preferable that the black strip BS disposed between the left-eye image and the right-eye image representing the same 3D image should be remained. In other words, the black strip BS disposed between the left-eye image and the right-eye image representing different 3D images from each other should be removed. For example, when the black strips BS disposed between the second retarder RT2 corresponding to the first line right-eye image R1 and the first retarder RT1 corresponding to the second line left-eye image L2 is removed, the images from them, respectively are not related each other, so that the cross-talk cannot be recognized by the observer. That is, in order to prevent the cross-talk problem, the black strip BS disposed between the first retarder RT1 corresponding to the first line left-eye image L1 and the second retarder RT2 corresponding to the first line right-eye image R1 should be remained.

Figure 7:
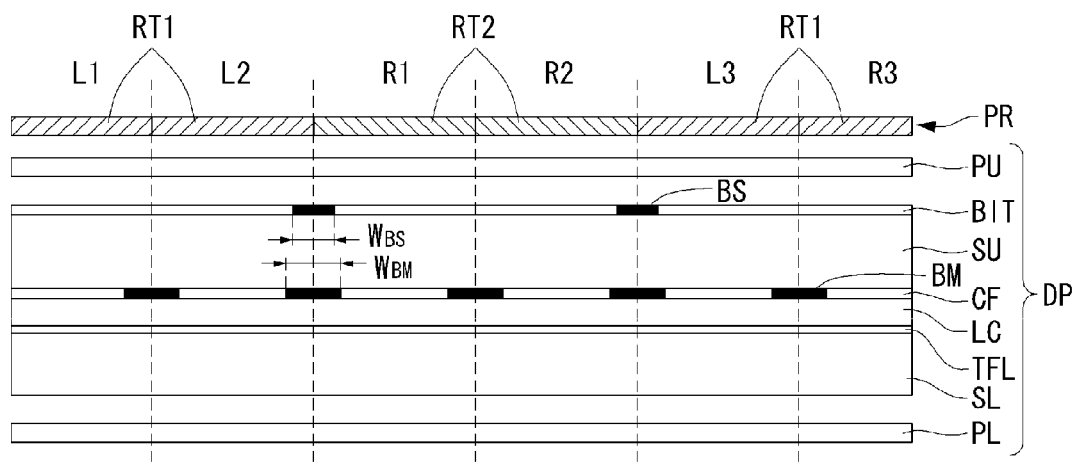
FIG. 7 is the cross-sectional view illustrating the structure of a patterned retarder type 3D display panel having a double-black strip, according to the third embodiment of the present disclosure.

Even though the second embodiment suggests the result in which the 3D cross-talk is not occurred severely or maintained in the same level with that of the first embodiment, depending to the kinds of the 3D image/video or the displaying conditions, the 3D cross-talk may be a serious problem. Hereinafter, in the third embodiment of the present disclosure, referring to FIG. 7, explained is the case in which the 3D cross-talk problem can be more effectively enhanced. FIG. 7 is the cross-sectional view illustrating the structure of a patterned retarder type 3D display panel having a double-black strip, according to the third embodiment of the present disclosure.

In the first and the second embodiments, the pixel line for representing the left-eye image and the pixel line for representing the right-eye image are alternatively disposed. However, in the third embodiment, the two pixel lines for representing the left-eye image are disposed closely and the two pixel lines for representing the right-eye image are disposed by neighbors. Furthermore, every two pixel lines representing the different eye image are alternatively disposed. In detail, the first retarder RT1 corresponding to the first line left-eye image L1 and the first retarder RT1 corresponding to the second line left-eye image L2 are disposed by neighbors. And then, the second retarder RT2 corresponding to the first line right-eye image R1 and the second retarder RT2 corresponding to the second line right-eye image R2 are disposed by neighbors. In other words, the first retarder RT1 covers two neighboring left-eye images and the second retarder RT2 neighboring the first retarder RT1 covers two neighboring right-eye images. Therefore, as the black strip BS is disposed between the first retarder RT1 and the second retarder RT2, one black strip BS is disposed at every two pixel lines.

In the third embodiment, like the second embodiment, the number of black strip BS is reduced in half. On the contrary, unlike the second embodiment, there should be a black strip BS between every of the left-eye image and the right-eye image. Therefore, the front brightness can be enhanced, at the same time, the 3D cross-talk can be further improved.

As shown in Table 2, as comparing the patterned retarder type 3D display panel having the double black strip according to the first embodiment and the patterned retarder type 3D display panel having the double black strip according to the third embodiment, the 3D viewing angle is remarkably enhanced. At the same time, the front brightness dropdown can be enhanced. In the Table 2, the "normal FPR" means the case in which the width of the black matrix BM is enlarged without forming the black strip BS, as shown in FIG. 3. The "first embodiment" means the case according to the first embodiment of the present disclosure as shown in FIG. 5. And, the "second embodiment" means the case according to the third embodiment of the present disclosure as shown in FIG. 7.

TABLE 2

|  | Normal FPR | First Embodiment | Second Embodiment |
| --- | --- | --- | --- |
| 3D viewing angle | 20° | 26° | 31° |
| Brightness dropdown | 0% (reference value) | 33% | 20% |

According to the first embodiment, the 3D viewing angle is enhanced about 6° than the case of Normal FPR, but the brightness is dropdown with 33%. On the contrary, according to the third embodiment, the 3D viewing angle is more enhanced to 31°. At the same time, the brightness at front side is reduced about 20%, so it is possible to ensure higher aperture ratio and the front brightness than the first embodiment.

Furthermore, comparing with the second embodiment referring to the Table 1, the front brightness of the third embodiment is the same level with that of the first embodiment, whilst the 3D viewing angle is more enhanced. That is, the patterned retarder type 3D display panel having the double black strip according to the third embodiment can accomplish the two purposes, the ensured front brightness and the enhanced 3D cross-talk.

Figure 8:
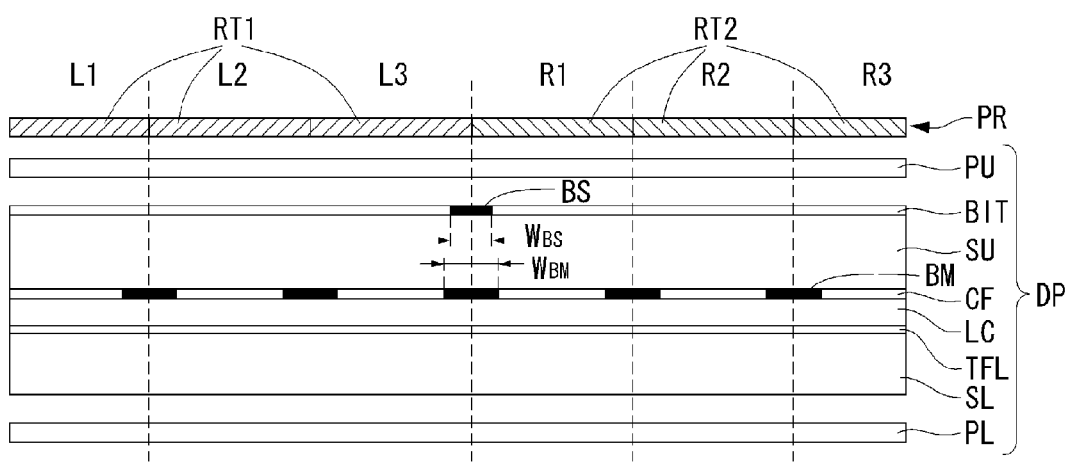
FIG. 8 is the perspective view illustrating the structure of a patterned retarder type 3D display panel having a double-black strip and an outer strip, according to the fourth embodiment of the present disclosure.

In the third embodiment, two pixel lines for representing the left-eye images and two pixel limes for representing the right-eye images are grouped, respectively so that it is possible to reduce the number of black strip placing between the left-eye image and the right-eye image in half. By expanding this concept, the number of the black strip BS can be reduced more and more. Hereinafter, referring to FIG. 8, the fourth embodiment according to the present disclosure will be explained. FIG. 8 is the perspective view illustrating the structure of a patterned retarder type 3D display panel having a double-black strip and an outer strip, according to the fourth embodiment of the present disclosure.

Referring to FIG. 8, the fourth embodiment suggests a display panel DP in which the three pixel lines representing the left-eye image are arrayed by neighbors, other three pixel lines representing the right-eye image are arrayed by neighbors, and every three pixel lines are alternatively disposed. In other words, the first line left-eye image L1, the second line left-eye image L2 and the third line left-eye images L3 are grouped and disposed by neighbors, and the first retarder RT1 is disposed as covering these three pixel lines. Next, in the same manner, the first line right-eye image R1, the second line right-eye image R2 and the third line right-eye images R3 are grouped and disposed by neighbors, and the second retarder RT2 is disposed as covering these three pixel lines. As the black strip BS is disposed between the first retarder RT1 and the second retarder RT2, one black strip BS is placed at every three pixel lines.

By comparing with the first embodiment, in the fourth embodiment, the number of black strip BS can be one-third. Comparing with the third embodiment, the number of the black strip BS can be more reduced. Furthermore, between the left-eye image and the right-eye image, one black strip BS should be existed. Therefore, the front brightness dropdown (or reduction) can be effectively prevented and the 3D cross-talk would not be occurred.

While the embodiment of the present invention has been described in detail with reference to the drawings, it will be understood by those skilled in the art that the invention can be implemented in other specific forms without changing the technical spirit or essential features of the invention. Therefore, it should be noted that the forgoing embodiments are merely illustrative in all aspects and are not to be construed as limiting the invention. The scope of the invention is defined by the appended claims rather than the detailed description of the invention. All changes or modifications or their equivalents made within the meanings and scope of the claims should be construed as falling within the scope of the invention.

What is claimed is:

1. A display device comprising:
a display panel having a plurality of unit pixel lines in a column direction, wherein each unit pixel line includes N (N is a natural number) pixel lines;
a patterned retarder film disposed on an outer surface of the display panel and including a plurality of unit patterned retarders, each of the unit patterned retarders respectively corresponding to each of the unit pixel lines;
a black strip disposed between two of the unit patterned retarders on the outer surface of the display panel; and
a black matrix on an inner surface of the display panel and between each pixel line,
wherein the black strip overlaps the black matrix in cross-section view,
wherein at least two of the pixel lines are between two neighboring black strips,
wherein a width of the black strip is less than half of a width of the black matrix in the cross-section view.

2. The device according to claim 1, wherein the unit pixel line is one of a left-eye pixel line for representing a left-eye image of one unit line image and a right-eye pixel line for representing a right-eye image of the one unit line image;
wherein the unit patterned retarder includes a first patterned retarder corresponding to the left-eye pixel line and a second patterned retarder corresponding to the right-eye pixel line; and
wherein the black strip is between the first patterned retarder and the second patterned retarder.

3. The device according to claim 2, wherein N is 1 and the unit pixel line includes one pixel line; and
wherein the black strip is only at every two pixel lines.

4. The device according to claim 3, wherein the black strip is between a left-eye pixel line representing one unit line image and a right-eye pixel line representing the one unit line image but not between the left-eye pixel line representing one unit line image and the right-eye pixel line representing another unit line image.

5. The device according to claim 1, wherein N is a natural number larger than 1 and each of the unit pixel lines includes N pixel lines; and
wherein the black strip is between two neighboring unit pixel lines.

6. The device according to claim 1, wherein at least three of the pixel lines are between the two neighboring black strips.

* * * * *